United States Patent
Konttori et al.

(10) Patent No.: US 12,477,095 B2
(45) Date of Patent: Nov. 18, 2025

(54) AUGMENTING REALITY WITH MULTISCOPIC SEE-THROUGH DISPLAY

(71) Applicant: Distance Technologies Oy, Helsinki (FI)

(72) Inventors: Urho Konttori, Helsinki (FI); Mikko Strandborg, Hangonkylä (FI)

(73) Assignee: Distance Technologies Oy, Helsinki (FI)

( * ) Notice: Subject to any disclaimer, the term of this patent is extended or adjusted under 35 U.S.C. 154(b) by 0 days.

(21) Appl. No.: 18/818,717

(22) Filed: Aug. 29, 2024

(65) Prior Publication Data

US 2025/0317547 A1 Oct. 9, 2025

Related U.S. Application Data

(63) Continuation-in-part of application No. 18/630,202, filed on Apr. 9, 2024, now Pat. No. 12,196,960.

(51) Int. Cl.
*H04N 13/315* (2018.01)
*H04N 13/344* (2018.01)
(Continued)

(52) U.S. Cl.
CPC ......... *H04N 13/315* (2018.05); *H04N 13/344* (2018.05); *H04N 13/383* (2018.05);
(Continued)

(58) Field of Classification Search
CPC .. H04N 13/315; H04N 13/383; H04N 13/344; H04N 13/398; H04N 2213/001;
(Continued)

(56) References Cited

U.S. PATENT DOCUMENTS 11,927,761 B1 * 3/2024 Hossain ............ G02B 27/0176
2008/0291269 A1 * 11/2008 Hong .................. H04N 13/354
348/E13.001
(Continued)

FOREIGN PATENT DOCUMENTS

WO 2019001745 A1 1/2019

OTHER PUBLICATIONS

European Patent Office, Extended European Search Report, Application No. 25166217.7, Mailed Aug. 21, 2025, 5 pages.
(Continued)

*Primary Examiner* — Thai Q Tran
*Assistant Examiner* — Jose M Mesa
(74) *Attorney, Agent, or Firm* — ZIEGLER IP LAW GROUP, LLC.

(57) ABSTRACT

A first virtual image and a second virtual image represent virtual object(s) from a perspective of a first eye and a second eye of user(s). A union of first image segment(s) in the first virtual image and second image segment(s) in the second virtual image that represent the virtual object(s) is determined. A given portion of a transparent display whereat said union is to be presented is determined. A light field image is displayed via the transparent display, whilst controlling a controllable parallax barrier arranged on an optical path of the transparent display. The step of controlling the controllable parallax barrier comprises activating a given portion of the controllable parallax barrier that corresponds to the given portion of the transparent display.

20 Claims, 5 Drawing Sheets

(51) Int. Cl.
*H04N 13/383* (2018.01)
*H04N 13/398* (2018.01)
*G02B 27/01* (2006.01)

(52) U.S. Cl.
CPC ..... *H04N 13/398* (2018.05); *G02B 2027/014* (2013.01); *G02B 27/0172* (2013.01); *G02B 2027/0187* (2013.01); *H04N 2213/001* (2013.01)

(58) Field of Classification Search
CPC .......... G02B 27/0172; G02B 2027/014; G02B 2027/0187
See application file for complete search history.

(56) References Cited

U.S. PATENT DOCUMENTS

| | | |
|---|---|---|
| 2012/0314017 A1 | 12/2012 | Gross |
| 2017/0323615 A1 | 11/2017 | Hazra et al. |
| 2019/0243151 A1* | 8/2019 | Hansen .............. G02B 27/0093 |
| 2019/0258061 A1 | 8/2019 | Solomon |
| 2023/0118979 A1 | 4/2023 | Mathur et al. |

OTHER PUBLICATIONS

European Patent Office, Extended European Search Report, Application No. 25166617.8, Mailed Aug. 21, 2025, 8 pages.

* cited by examiner

AUGMENTING REALITY WITH MULTISCOPIC SEE-THROUGH DISPLAY

CROSS-REFERENCE TO RELATED APPLICATIONS

This application is a continuation-in-part of U.S. patent application Ser. No. 18/630,202, titled "LOCAL DIMMING AND COMPENSATION IN LIGHT FIELD DISPLAY" and filed on Apr. 9, 2024, which is incorporated herein by reference.

TECHNICAL FIELD

The present disclosure relates to systems for augmenting reality with multiscopic see-through displays. The present disclosure also relates to methods for augmenting reality with multiscopic see-through displays.

BACKGROUND

A heads-up display (HUD) typically comprises a light field display unit and an optical combiner that optically combines a synthetic light field produced by the light field display unit with a real-world light field. The optical combiner is often implemented as a part of a windshield of a vehicle in which the HUD is installed. Such HUDs are typically employed to present virtual content (for example, such as vehicle instrumentation) to users.

However, conventional HUDs have certain drawbacks. Firstly, conventional HUDs have a limited field of view (FOV; for example, in a range of 10 degrees×5 degrees to 20 degrees×10 degrees), due to a limited size of the light field display unit that can be installed in a given vehicle. Herein, the term "field of view" refers to an angular extent of a virtual environment that can be presented at any given time instant through the HUD. Thus, a conventional HUD is capable of showing virtual content on only a small portion of a windshield of a vehicle in which it is installed. Such a limited FOV results in a less immersive user experience.

Secondly, conventional HUDs have a limited eye box. The term "eye box" refers to a spatial volume within which a user's head can move, while still allowing for a three-dimensional (3D) perception of the virtual environment. In other words, the eye box pertains to a range of positions where the user can place her/his eyes and still experience an autostereoscopic effect correctly. A limited eye box restricts a freedom of movement for the user when she/he is viewing the virtual environment, and, therefore, leads to user discomfort.

Therefore, in light of the foregoing discussion, there exists a need to overcome the aforementioned drawbacks.

SUMMARY

The present disclosure seeks to provide a system and a method that is capable of providing a relatively large field of view (for example, in a range of 55 degrees×25 degrees to 85 degrees×30 degrees, or even more) and a relatively large eye box for presenting virtual content augmenting real-world light for one or more users. The aim of the present disclosure is achieved by a system and a method for augmenting reality with a multiscopic see-through display, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1A:
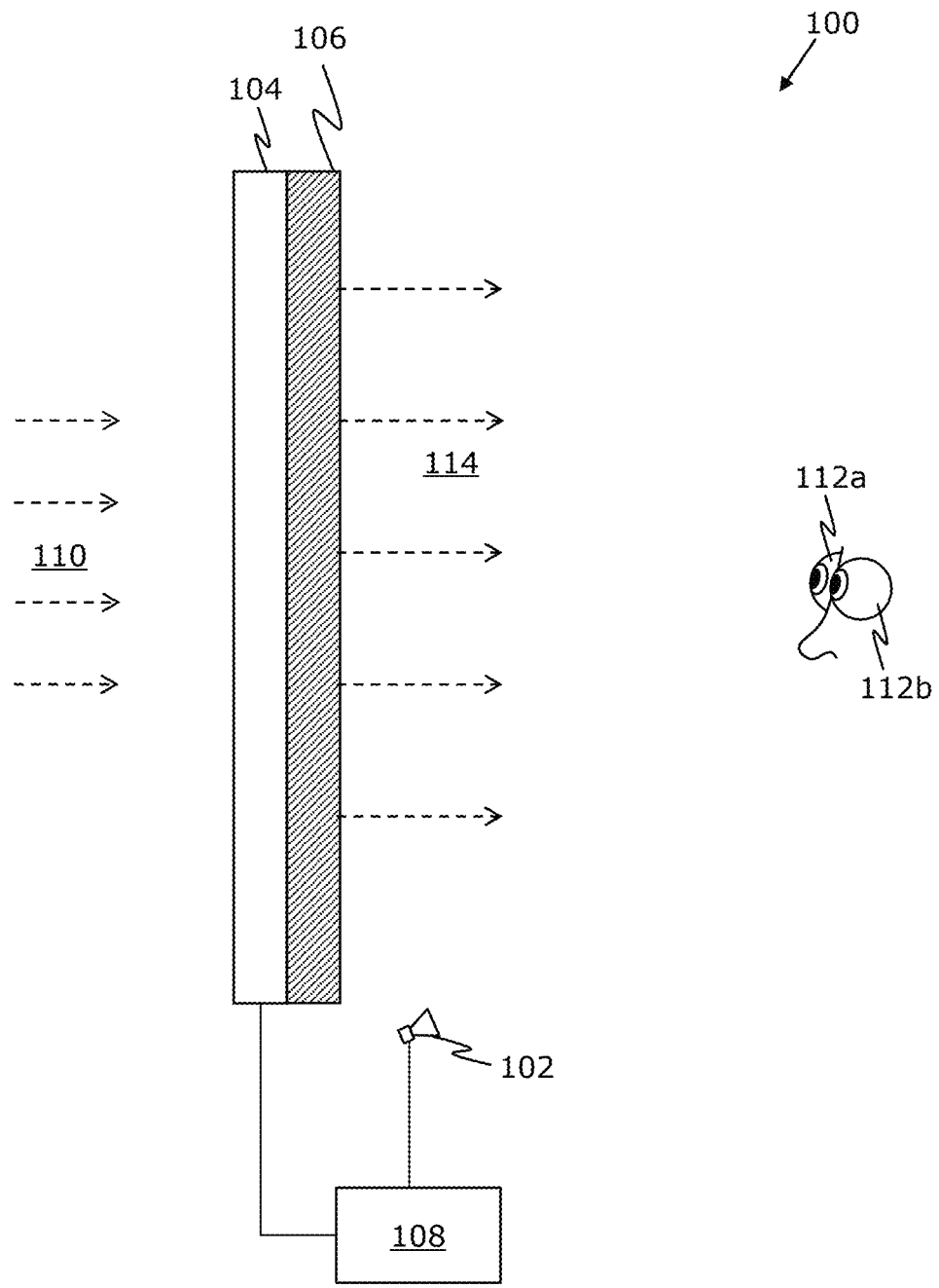
FIGS. 1A and 1B illustrate example implementations of a system for augmenting reality using a multiscopic see-through display, in accordance with different embodiments of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a system comprising:
  tracking means;
  a transparent display;
  a controllable parallax barrier arranged on an optical path of the transparent display; and
  at least one processor configured to:
    utilise the tracking means to determine a relative location of a first eye and of a second eye of at least one user with respect to the transparent display;
    retrieve or generate a first virtual image and a second virtual image representing at least one virtual object from a perspective of the first eye and the second eye of the at least one user, based on the relative location of the first eye and of the second eye of the at least one user with respect to the transparent display, respectively;
    determine a union of at least one first image segment in the first virtual image and at least one second image segment in the second virtual image that represent the at least one virtual object;

determine a given portion of the transparent display whereat said union of the at least one first image segment and the at least one second image segment is to be presented; and display a light field image via the transparent display, whilst controlling the controllable parallax barrier, based on the relative location of the first eye and of the second eye of the at least one user with respect to the transparent display, to direct light produced by a first set of pixels and a second set of pixels of the light field image towards the first eye and the second eye, respectively, the first set of pixels being generated from the at least one first image segment in the first virtual image, the second set of pixels being generated from the at least one second image segment in the second virtual image, wherein, when controlling the controllable parallax barrier, the at least one processor is configured to activate a given portion of the controllable parallax barrier that corresponds to the given portion of the transparent display.

In a second aspect, an embodiment of the present disclosure provides a method comprising:

utilising tracking means to determine a relative location of a first eye and of a second eye of at least one user with respect to a transparent display;

retrieving or generating a first virtual image and a second virtual image representing at least one virtual object from a perspective of the first eye and the second eye of the at least one user, based on the relative location of the first eye and of the second eye of the at least one user with respect to the transparent display, respectively;

determining a union of at least one first image segment in the first virtual image and at least one second image segment in the second virtual image that represent the at least one virtual object;

determining a given portion of the transparent display whereat said union of the at least one first image segment and the at least one second image segment is to be presented; and displaying a light field image via the transparent display, whilst controlling a controllable parallax barrier arranged on an optical path of the transparent display, based on the relative location of the first eye and of the second eye of the at least one user with respect to the transparent display, to direct light produced by a first set of pixels and a second set of pixels of the light field image towards the first eye and the second eye, respectively, the first set of pixels being generated from the at least one first image segment in the first virtual image, the second set of pixels being generated from the at least one second image segment in the second virtual image, wherein the step of controlling the controllable parallax barrier comprises activating a given portion of the controllable parallax barrier that corresponds to the given portion of the transparent display.

The present disclosure provides the aforementioned system and the aforementioned method for augmenting reality using a multiscopic see-through display. In this regard, the multiscopic see-through display is implemented by combining the transparent display with the controllable parallax barrier. A synergistic effect of such a combination of the transparent display and the controllable parallax barrier is that a relatively large field of view (FOV; for example, in a range of 55 degrees×25 degrees to 85 degrees×30 degrees) and a relatively large eye box can be provided for presenting virtual content to the at least one user. The multiscopic see-through display is employed to optically combine a real-world light field passing therethrough with a synthetic light field produced by the transparent display. In case of a vehicle where the system is implemented as a heads-up display (HUD), the transparent display and the controllable parallax barrier can be integrated into a windshield and/or other windows of the vehicle. In such a case, a size of the transparent display is only limited by a size of the windshield and/or the other windows of the vehicle. Moreover, the system is susceptible to be utilised for other use cases (for example, such as digital signage in retail stores, museums, and public spaces) as well. As the at least one virtual object can be presented on a relatively large portion of a windshield of a vehicle (in which the system is integrated), it is possible to facilitate a highly immersive user experience without any user discomfort. This is made possible because the system and the method allow the at least one user to freely move her/his head in a large range of positions, while experiencing an autostereoscopic effect correctly.

Furthermore, the system and the method are robust, fast, reliable, and support real-time simultaneous presentation of virtual images to eyes of one or more users.

The at least one processor controls an overall operation of the system. The at least one processor is communicably coupled to the tracking means, the transparent display and the controllable parallax barrier. Optionally, the at least one processor is implemented as a processor of the transparent display. Alternatively, optionally, the at least one processor is implemented as a processor of a computing device that is communicably coupled to the transparent display. Examples of the computing device include, but are not limited to, a laptop, a desktop, a tablet, a phablet, a personal digital assistant, a workstation, and a console. Yet alternatively, optionally, the at least one processor is implemented as a cloud server (namely, a remote server) that provides a cloud computing service.

Throughout the present disclosure, the term "tracking means" refers to a specialised equipment for detecting and/or tracking a location of at least a first eye and a second eye of a given user. Additionally or alternatively, the tracking means may be employed to detect and/or track a location of a head of the given user. Optionally, the tracking means is implemented as at least one tracking camera. The at least one tracking camera may comprise at least one of: at least one visible-light camera, at least one infrared (IR) camera, at least one depth camera. Examples of such a visible-light camera include, but are not limited to, a Red-Green-Blue (RGB) camera, a Red-Green-Blue-Alpha (RGB-A) camera, a Red-Green-Blue-Depth (RGB-D) camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Examples of such a depth camera include, but are not limited to, a Time-of-Flight (ToF) camera, a light detection and ranging (LiDAR) camera, a Red-Green-Blue-Depth (RGB-D) camera, a laser rangefinder, a stereo camera, a plenoptic camera, a ranging camera, a Sound Navigation and Ranging (SONAR) camera. It will be appreciated that any combination of various different types of cameras (for example, such as the at least one visible-light camera, the at least one IR camera and the at least one depth camera) may be utilised in the tracking means. When different types of images captured by the various different types of tracking cameras are utilised, the location of the user's eyes can be determined highly accurately, as results obtained from one type of image can be used to refine results obtained from another type of image. Herein, these different types of images constitute the tracking data collected by the tracking means, and may be in the form of at least one of: visible-light images, IR images, depth images. It will be appreciated that the tracking means tracks both eyes (namely, the first eye and the second eye) of the at least one user with a significantly high accuracy and precision, such that an error in determining the relative location may, for example, be minimised to within a tolerance range of approximately (+/−)8 millimetres.

It will be appreciated that the at least one tracking camera is arranged to face the at least one user, to facilitate tracking of the location of the user's eyes. A relative location of the at least one tracking camera with respect to the transparent display is pre-known. This enables to determine the relative location of the first eye and of the second eye of the at least one user with respect to the transparent display. Optionally, in this regard, when the tracking means are utilised to detect and/or track the location of the first eye and of the second eye, a location of the first eye and of the second eye with respect to the at least one tracking camera is accurately known. Thus, the relative location of the first eye and of the second eye with respect to the transparent display can be determined, based on the relative location of the at least one tracking camera with respect to the transparent display and the location of the first eye and of the second eye with respect to the at least one tracking camera.

It will be appreciated that the tracking means is employed to repeatedly track the location of at least the eyes (namely, the first eye and the second eye) of the given user throughout a given session. This allows for repeatedly determining the relative location of the first eye and of the second eye with respect to the transparent display in real time or near-real time. Beneficially, this allows for presenting the at least one user with an augmented view of the synthetic light field produced by the transparent display with the real-world light field in an autostereoscopic manner. It is to be understood that when the synthetic light field is being produced for a plurality of users simultaneously, relative locations of both eyes (namely, the first eye and the second eye) of each user from amongst the plurality of users are determined in a same manner as discussed hereinabove.

Throughout the present disclosure, the term "transparent display" refers to a display that, in operation, produces a synthetic light field presenting virtual content (namely, the at least one virtual object), whilst allowing a given user to see real-world objects through it. Examples of the transparent display include, but are not limited to, a transparent organic light-emitting diode (OLED) display, a transparent micro-LED display, and a thin film electroluminescence (TFEL) based display (for example, such as Lumineq®). Such transparent displays are well-known in the art.

The controllable parallax barrier can also be referred to as a switchable parallax barrier. The controllable parallax barrier can be implemented as any one of: a switchable liquid crystal (LC) shutter array, a switchable LC barrier, a transparent/diffuse switchable film (for example, made of a polymer-dispersed liquid crystal (PDLC)). In case of the transparent/diffuse switchable film, the controllable parallax barrier (or its part) can be controlled to function in a transparent mode (namely, an activated mode) in which the controllable parallax barrier acts as a parallax barrier, thereby activating a three-dimensional (3D) autostereoscopic effect. On the other hand, in a diffuse mode (namely, a deactivated mode), the transparent/diffuse switchable film disturbs a direction of light and makes the controllable parallax barrier ineffective, thereby allowing for presenting the virtual content as a two-dimensional (2D) visual scene, without any autostereoscopic effect. The aforementioned examples of the controllable parallax barrier are well-known in the art.

However, pursuant to embodiments of the present disclosure, it will be appreciated that the controllable parallax barrier can be controlled in a segmented manner. In other words, an entirety of the controllable parallax barrier need not be activated or deactivated at once. Instead, at least one portion (for example, the aforementioned given portion) of the controllable parallax barrier can be activated, while a remaining portion of the controllable parallax barrier can be deactivated. In the remaining portion of the controllable parallax barrier (that is deactivated), no virtual content is presented via the transparent display for any of the plurality of users. As a result, all the users see the real-world environment through the remaining portion of the controllable parallax barrier.

Optionally, the at least one processor is configured to generate the light field image, based on the relative location of the first eye and of the second eye of the at least one user with respect to the transparent display. The light field image may be understood to be a 2D image comprising a plurality of pixels, wherein the first set of pixels from amongst the plurality of pixels is responsible for generating a first part of the synthetic light field that corresponds to the first eye, and the second set of pixels from amongst the plurality of pixels is responsible for generating a second part of the synthetic light field that corresponds to the second eye. It will be appreciated that the pixels belonging to the first set are not arranged in a continuous manner across the light field image; similarly, the pixels belonging to the second set are also not arranged in a continuous manner across the light field image. Optionally, the pixels belonging to the first set and the pixels belonging to the second set are arranged in alternating vertical stripes across a horizontal FOV of the light field image, wherein each vertical stripe comprises one or more scanlines of pixels. This is because humans perceive depth mainly based on horizontal binocular parallax. Thus, in this way, the light field image would be considerably different as compared to a conventional 2D image that is displayed via conventional 2D displays, because the same light field image would comprise visual information corresponding to the first eye as well as the second eye of the at least one user. It will also be appreciated that in a case where the at least one user comprises a plurality of users, the same light field image is displayed for presenting the virtual content to the plurality of users simultaneously. In such a case, the light field image would comprise a corresponding first set of pixels and a corresponding second set of pixels for the first eye and the second eye of each of the plurality of users.

The light field image can be generated from the first virtual image and the second virtual image that are to be presented to the first eye and the second eye, respectively. In a case where the at least one user comprises a plurality of users, there would be a corresponding pair of a first virtual image and a second virtual image for each of the plurality of users.

In some implementations, the first virtual image and the second virtual image are generated from a perspective of the relative location of the first eye and of the second eye of the at least one user with respect to the transparent display, by employing a 3D model of the at least one virtual object. It will be appreciated that the relative location of the first eye and of the second eye with respect to the transparent display indicate a viewing direction of the first eye and a viewing direction of the second eye, respectively. Therefore, the first virtual image and the second virtual image are generated based on these viewing directions. Hereinabove, the term "virtual object" refers to a computer-generated object (namely, a digital object). Examples of the at least one virtual object may include, but are not limited to, a virtual navigation tool, a virtual gadget, a virtual message, a virtual entity, a virtual entertainment media, and a virtual information. The term "three-dimensional model" of the at least one virtual object refers to a data structure that comprises comprehensive information pertaining to the at least one virtual object. Such a comprehensive information is indicative of at least one of: a plurality of features of the at least one virtual object or its portion, a shape and a size of the at least one virtual object or its portion, a pose of the at least one virtual object or its portion, a material of the at least one virtual object or its portion, a colour and an optical depth of the at least one virtual object or its portion. The 3D model may be generated in the form of a 3D polygonal mesh, a 3D point cloud, a 3D surface cloud, a voxel-based model, or similar. Optionally, the at least one processor is configured to store the 3D model at a data repository that is communicably coupled to the at least one processor. The data repository may be implemented as a memory of the at least one processor, a cloud-based database, or similar. In other implementations, the first virtual image and the second virtual image are retrieved in a form of 2D user interface (UI) elements. The 2D UI elements could pertain to, for example, a virtual navigation tool, a virtual gadget, a virtual message, a virtual entity, a virtual entertainment media, a virtual information, or similar.

Throughout the present disclosure, the term "synthetic light field" refers to a light field that is produced (namely, generated) synthetically by the transparent display, while the term "real-world light field" refers to a light field emanating from a real-world environment in which the at least one user is present. It will be appreciated that in case of the real-world light field, light from, for example, a natural light source (such as the Sun) and/or an artificial light source (such as a lamp, a bulb, a tube-light, or similar), are reflected off real-world objects (or their portions) to be incident towards the eyes of the at least one user. In this way, visual information (for example, such as colour information, optical depth information, and the like) pertaining to said real-world objects is typically perceived by the first eye and the second eye. On the other hand, in case of the synthetic light field, light corresponding to the first set of pixels and light corresponding to the second set of pixels (emanating from the transparent display) is incident on the first eye and the second eye of the at least one user, respectively. In this way, visual information pertaining to the at least one virtual object can be perceived by the first eye and the second eye.

Optionally, when generating the light field image, the at least one processor is configured to determine, within the light field image, a position of a given pixel of the first set and a position of a given pixel of the second set that correspond to a given synthetic 3D point, based on an interpupillary distance between the first eye and the second eye of the at least one user and an optical depth at which the given synthetic 3D point is to be displayed. The technical benefit of determining said positions is that the given synthetic 3D point can be presented accurately and realistically, by utilising binocular disparity, based on the interpupillary distance and the optical depth at which the given synthetic 3D point is to be displayed.

It will be appreciated that when the at least one virtual object (or its part) is to be presented at an optical depth that is similar to a native optical depth of the transparent display from the at least one user, there is no need for displaying different virtual images to the first eye and the second eye; in other words, a same virtual image would be shown to both the eyes. Herein, the native optical depth of the transparent display is equal to a distance between a given eye of a given user and the transparent display. By "similar" hereinabove, it is meant that said optical depth is within, for example, 10 centimetre of the native optical depth. In a typical implementation inside a vehicle, the native optical depth of the transparent display may lie in a range of 50 cm to 250 cm.

When the at least one virtual object is to be presented to appear far away from the first eye and the second eye (for example, 100 metres away), this means that the given synthetic 3D point is to be displayed at an optical depth with respect to the first eye and the second eye that is much larger than the native optical depth of the transparent display, and thus, the distance between the given pixel of the first set and the given pixel of the second set may be similar to the interpupillary distance. By "similar" hereinabove, it is meant that said distance is within, for example, 1 centimetre of the interpupillary distance.

Similarly, when the at least one virtual object is to be presented to appear near the first eye and the second eye (for example, at a distance of 10 centimetres), this means that the given synthetic 3D point is to be displayed at an optical depth with respect to the first eye and the second eye that is much smaller than the native optical depth of the transparent display. In such a case, a degree of cross-eyedness increases for the given user. This occurs because the eyes of the given user need to converge more sharply to focus on nearby objects. In such a case, the distance between the given pixel of the first set and the given pixel of the second set may be similar to the interpupillary distance, or may be even more than the interpupillary distance (only constrained by physical dimensions of the transparent display).

On the other hand, when the at least one virtual object is to be presented at an optical depth that is not similar to the native optical depth, and that lies between the native optical depth and an infinite distance (namely, optical infinity), or between the native optical depth and zero optical depth, the distance between the given pixel of the first set and the given pixel of the second set may be smaller than the interpupillary distance. In such a case, said distance may be determined based on a convergence angle of the user's eyes.

It will also be appreciated that when the optical depth at which the given synthetic 3D point is to be displayed is greater than the native optical depth of the transparent display, a disparity between the given pixel of the first set and the given pixel of the second set would be positive. On the other hand, when the optical depth at which the given synthetic 3D point is to be displayed is smaller than the native optical depth, the disparity between the given pixel of the first set and the given pixel of the second set would be negative. Hereinabove, when the disparity is positive, the position of the given pixel of the first set would be on a side of the first eye, and the position of the given pixel of the second set would be on a side of the second eye. When the disparity is positive, said disparity may increase asymptotically to reach its maximum value, which is equal to the interpupillary distance. However, when the disparity is negative, the position of the given pixel of the first set would be on the side of the second eye, and the position of the given pixel of the second set would be on the side of the first eye, i.e., an order of the position of the given pixel of the first set and the position of the given pixel of the second set is swapped.

As mentioned earlier, the first set of pixels are generated from the at least one first image segment in the first virtual image, while the second set of pixels are generated from the at least one second image segment in the second virtual image. The at least one first image segment in the first virtual image and the at least one second image segment in the second virtual image represent the at least one virtual object. The union of the at least one first image segment and the at least one second image segment is determined. Notably, in the aforesaid union, the pixels belonging to the first set and the pixels belonging to the second set are arranged in the alternating vertical stripes across the horizontal FOV of the light field image. The given portion of the transparent display whereat said union is to be presented is then determined. It will be appreciated that the given portion of the transparent display need not be a single, continuous portion of the transparent display.

When the light field image is displayed via the transparent display, the controllable parallax barrier is controlled, based on the relative location of the first eye and of the second eye of the at least one user with respect to the transparent display, to direct the light produced by the first set of pixels and the second set of pixels towards the first eye and the second eye, respectively. In this regard, sizes and locations of transparent portions and opaque portions in the controllable parallax barrier are fine-tuned, based on current viewing positions, namely, the relative location of the first eye and the second eye of each user. Such a manner of controlling the controllable parallax barrier is well-known in the art. Pursuant to embodiments of the present disclosure, when controlling the controllable parallax barrier, the given portion of the controllable parallax barrier that corresponds to the given portion of the transparent display is activated. By "corresponds", it is meant that the given portion of the controllable parallax barrier lies on the optical path of the given portion of the transparent display.

Additionally, optionally, when controlling the controllable parallax barrier, the at least one processor is configured to deactivate a remaining portion of the controllable parallax barrier. The remaining portion of the controllable parallax barrier is a portion of the controllable parallax barrier that does not correspond to the given portion of the transparent display whereat the aforesaid union is being presented (to present the at least one virtual object). In other words, the controllable parallax barrier is activated on a need basis only. A technical benefit of deactivating the remaining portion of the controllable parallax barrier is that the real-world light field is allowed to pass through the remaining portion of the controllable parallax barrier without any parallax barrier effect. As a result, the real-world light field is not unnecessarily dimmed, and the user is able to see the real-world environment without any ghosting artefacts.

Moreover, optionally, the system further comprises at least one real-world-facing camera, wherein the at least one processor is configured to:
  utilise the at least one real-world-facing camera to capture at least one 2D real-world image of the real-world environment;
  generate at least one synthetic 2D image corresponding to a given eye of the at least one user by utilising the at least one 2D real-world image, based on a relative location of the given eye with respect to the transparent display, wherein the at least one synthetic 2D image represents at least one real-world object in the real-world environment from a perspective of the given eye; and
  generate the light field image by utilising the first virtual image and the second virtual image representing the at least one virtual object and the at least one synthetic 2D image representing the at least one real-world object, wherein when generating the light field image, the at least one processor is configured to:
    generate a region of the light field image that corresponds to said union, based on the at least one first image segment in the first virtual image and the at least one second image segment in the second virtual image that correspond to the at least one virtual object; and
    generate at least a part of a remaining region of the light field image, based on the at least one synthetic 2D image representing the at least one real-world object.

A technical benefit of this is that ghosting artefacts caused by the controllable parallax barrier are compensated by presenting the at least one real-world object via the synthetic light field. This is particularly highly beneficial for cases where a part of the controllable parallax barrier, which has been activated to present the at least one virtual object to a given user (from amongst the plurality of users), is unintentionally dimming the real-world light field passing therethrough (namely, passing through the same part of the controllable parallax barrier) towards other user(s). In other words, each activated part of the controllable parallax barrier for a given eye of the given user potentially causes unintentional dimming in a part of the real-world light field for another eye of the given user and/or for the eyes of the other user(s). This is because when presented to multiple users simultaneously, the same virtual content (namely, the at least one virtual object) is presented through different portions of the transparent display.

In this regard, the at least one real-world-facing camera is arranged to face the real-world environment. The at least one real-world-facing camera comprises at least one visible-light camera and optionally, at least one depth camera. The at least one synthetic 2D image could comprise a first synthetic 2D image and a second synthetic 2D image corresponding to the first eye and the second eye, respectively. However, in a case where the at least one real-world object is at an infinite distance (namely, optical infinity), it may be sufficient to generate a single synthetic 2D image, as there would not be much offset in the view for the first eye and the second eye.

Optionally, the at least one 2D real-world image can be reprojected from a perspective of the at least one real-world-facing camera to the perspective of the given eye, based on a pose of the at least one real-world-facing camera and the relative position of the given eye with respect to the transparent display. Such a reprojection is performed prior to utilising the at least one 2D real-world image to generate the at least one synthetic 2D image corresponding to the given eye. It will be appreciated that in a case where the at least one real-world object is at optical infinity, it may not be necessary to reproject the at least one 2D real-world image.

Optionally, at least a part of the at least one 2D real-world image or the at least one synthetic 2D image is convoluted (namely, blurred slightly), prior to being utilised for generating the light field image. Said part of the at least one 2D real-world image or the at least one synthetic 2D image can be determined based on gaze directions of the first eye and the second eye of the at least one user. In this regard, blurring involves smoothing out details in a given image. Such blurring can be achieved by using various convolution techniques, for example, such as a box blur, a Gaussian blur, a median blur, a bilateral filter, or similar. The box blur involves a simple averaging of intensity values of pixels within a given kernel size. The Gaussian blur involves use of a kernel that is based on a Gaussian function to provide a weighted average, wherein pixels located at a central part of a given kernel size have a higher weightage. The median blur involves replacing an intensity value of a given pixel with a median value of its neighbouring pixels within a given kernel size. The bilateral filter involves smoothening an image while preserving edges by considering both a spatial distance and an intensity difference between pixels. Optionally, said blurring can be performed by utilising a predefined kernel size. The predefined kernel size can be selected based on a resolution of the at least one 2D real-world image or the at least one synthetic 2D image. Moreover, the predefined kernel size can be selected to achieve a predefined level of blurring. The predefined level of blurring may be expressed in terms of a predefined percent, which may, for example, lie in a range of 5 percent to 15 percent. As an example, for a 5 percent blurring using a Gaussian blur, the predefined kernel size can be selected as 3×3 pixels or 5×5 pixels with a low sigma (namely, standard deviation) value. As another example, for a 5 percent blurring using a box blur, the predefined kernel size can be selected as 3×3 pixels or 5×5 pixels. The predefined level of blurring may be selected to allow for smooth blending of the blurring effect. All these techniques are well-known in the art. A technical benefit of such convoluting is that it minimises artefacts arising from reprojection-related inaccuracies and/or tracking-related inaccuracies.

The light field image is then generated by utilising the first virtual image and the second virtual image (that represent the at least one virtual object), and the at least one synthetic 2D image (that represents the at least one real-world object). In this regard, the at least one real-world object is re-created in the remaining region of the light field image only, namely at another region where there is no virtual content being displayed. It will be appreciated that the remaining region of the light field image is a region of the light field image that does not correspond to the aforesaid union.

As mentioned earlier, at least the part of the remaining region of the light field image is generated by utilising the at least one synthetic 2D image. In some implementations, the part of the remaining region of the light field image is determined based on one or more activated portions (including the aforementioned given portion) of the controllable parallax barrier. Note that the one or more activated portions of the controllable parallax barrier may not only correspond to one or more portions of the transparent display whereat the aforesaid union is determined to be presented, but may also correspond to one or more additional portions of the transparent display that are surrounding these one or more portions. This takes into account any errors in determining the exact portions of the transparent display whereat the aforesaid union is being presented, as well as any delays in activating or deactivating portions of the controllable parallax barrier when the at least one virtual content is moving across the FOV of the transparent display. In other implementations, an entirety of the controllable parallax barrier may be activated, whilst the light field image is being displayed via the transparent display. In such implementations, only the part of the remaining region of the light field image is generated by utilising the at least one synthetic 2D image. This is because it may not be necessary to re-create all the real-world objects in an entirety of the remaining region of the light field image. As an example, where there is sky in the at least one 2D real-world image, the sky does not need to be re-created in the light field image.

Furthermore, optionally, the at least one processor is configured to:
determine an amount of attenuation caused by the controllable parallax barrier to the real-world light field at the remaining portion of the controllable parallax barrier; and
when generating at least the part of the remaining region of the light field image, generate intensity values for said part of the remaining region of the light field image, based on the amount of attenuation caused.

A technical benefit of this is that it allows to compensate for an attenuation caused to the real-world light field by the controllable parallax barrier (namely, by an activated portion of the controllable parallax barrier). If the amount of attenuation caused were not taken into account when generating the intensity values, the intensity values for said part of the remaining region of the light field image would be taken as intensity values of pixels in the at least one synthetic 2D image (namely, as it is). When these intensity values add up with an actual light intensity of the real-world light field that is passing through the controllable parallax barrier, it would produce a relatively brighter image of the real-world environment. This would not only make the at least one virtual object look darker as compared to the at least one real-world object, but would also make the at least one real-world object look brighter than other real-world objects that can be seen through other portions of the controllable parallax barrier that are deactivated.

The amount of attenuation can be determined in terms of a percentage by which the light intensity of the real-world light field reduces upon passing through the controllable parallax barrier (namely, the activated portion thereof). As a first example, in case of a single user, the light intensity is typically reduced by approximately 50 percent upon passing through an activated portion of the controllable parallax barrier. This is because a first part and a second part of the real-world light field are redirected towards the first eye and the second eye, respectively. As a second example, in case of two users, the light intensity may be reduced by approximately 75 percent. Therefore, the intensity values for said part of the remaining region of the light field image can be generated to compensate for the percentage by which the light intensity reduces. So, in the aforementioned first example, the intensity values can be determined as approximately 50 percent of the intensity values of the pixels in the at least one synthetic 2D image. Herein, the phrase "approximately 50 percent" refers to a percentage that lies in a range of 45 percent to 55 percent. On the other hand, in the aforementioned second example, the intensity values can be determined as approximately 75 percent of the intensity values of the pixels in the at least one synthetic 2D image. Herein, the phrase "approximately 75 percent" refers to a percentage that lies in a range of 70 percent to 80 percent.

Moreover, optionally, the at least one processor is configured to:
utilise the tracking means to determine gaze directions of the first eye and the second eye of the at least one user;
detect, based on the gaze directions, when the at least one user is gazing through the given portion of the transparent display; and
when it is detected that the at least one user is gazing through the given portion of the transparent display, perform any one of:
skip generating the at least one synthetic 2D image representing the at least one real-world object, or
generate the at least one synthetic 2D image at a second resolution that is lower than a first resolution, wherein a given synthetic 2D image is generated at the first resolution when it is detected that the at least one user is gazing through a remaining portion of the transparent display.

In this regard, the tracking means can be implemented as the gaze-tracking means. In this regard, the at least one processor is configured to utilise tracking data collected by the tracking means, for determining the gaze directions of the first eye and the second eye of the at least one user. Optionally, when the tracking data comprises a plurality of images of a given eye of a given user, the at least one processor is configured to: extract a plurality of features of the given eye from a given image; and determine based on the plurality of features at least one of: a position of a pupil of the given eye with respect to corners of the given eye, a curvature of an eyelid of the given eye, a position of an eyelash of the given eye, a shape of the given eye, a size of the given eye. Such gaze-tracking is well-known in the art.

Knowing the gaze directions of the eyes as well as the relative location of the first eye and the second eye with respect to the transparent display allow for detecting when the at least one user is gazing through the given portion of the transparent display. When the at least one user is gazing through the given portion of the transparent display, it means that the at least one user is not gazing through the remaining portion of the transparent display. Optionally, in such a case, the at least one synthetic 2D image is not utilised to generate the light field image. Accordingly, the step of generating the at least one synthetic 2D image (representing the at least one real-world object) may be skipped entirely. Alternatively, optionally, the at least one synthetic 2D image is generated at a lower resolution (namely, the second resolution). Advantageously, skipping the step of generating the at least one synthetic 2D image, or generating the at least one synthetic 2D image at the lower resolution facilitates in saving processing resources and processing time of the at least one processor.

Furthermore, optionally, the system further comprises an active optical device arranged on an optical path of the real-world light field, wherein the at least one processor is configured to:
  determine a given portion of the active optical device that corresponds to the given portion of the transparent display whereat said union of the at least one first image segment and the at least one second image segment is to be presented; and
  activate the given portion of the active optical device to decrease a transmission of a part of the real-world light field passing through the given portion of the active optical device towards the given portion of the transparent display.

Throughout the present disclosure, the term "active optical device" refers to an optical device that can be controlled actively to control the transmission of the real-world light field. In particular, one or more portions of the active optical device can be activated selectively. In this regard, the given portion of the active optical device can be activated to at least partially block the real-world light field passing through the given portion. Hereinabove, by "corresponds", it is meant that the given portion of the transparent display lies on an optical path of the given portion of the active optical device.

The active optical device can be implemented as solid-state optics. As an example, the active optical device can be implemented as a liquid-crystal-based optical device, or an electrochromic optical device. The active optical device can be implemented in a form of any one of: (i) a layer on a real-world-facing side of the transparent display, (ii) a separate device arranged between the transparent display and the real-world environment.

A technical benefit of activating the given portion of the active optical device to decrease the transmission of the part of the real-world light field is that it allows the at least one user to see clearly the at least one virtual object being presented by the synthetic light field, due to an improved contrast, thereby enhancing an overall visual experience of the at least one user. It will be appreciated that such local dimming (namely, decreasing the transmission) need not be performed for an entirety of the synthetic light field, and can be performed for certain parts of the synthetic light field on a need basis. Decreasing the transmission may be particularly beneficial when visual information that is critical for the user is being presented, because by incorporating local dimming, visibility of such critical visual information is not obscured by brightness of the real-world light field in the real-world environment. Optionally, in this regard, when the first virtual image and the second virtual image are generated by employing the 3D model of the at least one virtual object, the 3D model could be tagged with a flag indicating whether a given virtual object pertains to visual information that is critical. This allows to determine which part of the synthetic light field should be selectively presented with greater clarity. Such criticality may be applicable for certain specific scenarios or may be applicable at all times. As an example, when the system is implemented in a vehicle, visual information pertaining to instrumentation (for example, such as a speed gauge and warning lights) may be considered critical.

Optionally, the at least one processor is configured to:
  utilise the tracking means to determine gaze directions of the first eye and the second eye of the at least one user;
  determine, based on the gaze directions, a gaze portion of the transparent display;
  detect when the gaze portion of the transparent display does not overlap with the given portion of the transparent display whereat said union of the at least one first image segment and the at least one second image segment is to be presented; and
  when it is detected that the gaze portion of the transparent display does not overlap with the given portion of the transparent display, skip activating the given portion of the active optical device to decrease the transmission.

When the gaze portion of the transparent display does not overlap with the given portion of the transparent display whereat said union is to be presented, it means that the at least one user is not gazing at the at least one virtual object being presented. In such a case, it may be advantageous to skip activating the given portion of the active optical device (to decrease the transmission) entirely, because each dimmed part of the real-world light field for a given eye of a given user potentially causes unintentional dimming in other parts of the real-world light field for another eye of the given user and/or for the eyes of the other user(s). This is because when presented to multiple users simultaneously, the same virtual content is presented through different portions of the transparent display; therefore, local dimming for the given eye of the given user via the given portion of the active optical device results in unintended dimming for the other eye of the given user and/or for the eyes of the other user(s). On the other hand, when it is detected that the gaze portion of the transparent display overlaps with the given portion of the transparent display, the given portion of the active optical device can be activated to decrease the transmission, as mentioned earlier.

Optionally, the at least one processor is configured to:
utilise the tracking means to determine gaze directions of the first eye and the second eye of the at least one user;
determine an optical depth at which the at least one user is gazing, based on the gaze directions;
detect when a difference between the optical depth at which the at least one user is gazing and an optical depth at which the at least one virtual object is being presented is greater than a predefined threshold difference; and
when it is detected that said difference is greater than the predefined threshold difference, perform any one of:
skip activating the given portion of the active optical device to decrease the transmission, or
activate the given portion of the active optical device to increase the transmission of the part of the real-world light field passing through the given portion of the active optical device towards the given portion of the transparent display.

In this regard, the optical depth at which the at least one user is gazing can be determined based on an interpupillary distance of the at least one user and a convergence of the gaze directions of the eyes of the at least one user. The tracking means can be utilised to determine a location of the first eye and a location of the second eye in a local coordinate space, and to determine the interpupillary distance, based on the determined location of the first eye and the determined location of the second eye. Alternatively or additionally, the optical depth at which the at least one user is gazing can also be determined based on an intersection of at least one of the gaze directions with a depth map of the real-world environment.

The optical depth at which the at least one virtual object is being presented is known, because it correlates with a disparity between the first virtual image and the second virtual image presented to the first eye and the second eye of the at least one user. When the difference between the optical depth at which the at least one user is gazing and the optical depth at which the at least one virtual object is being presented is greater than the predefined threshold difference, it means that the user is looking at a real-world object, instead of the at least one virtual object. In this regard, the predefine threshold difference can be expressed in terms of a predefined percent of any one of: the optical depth at which the at least one user is gazing, the optical depth at which the at least one virtual object is being presented. As an example, the predefined percent could lie in a range of 10 percent to 20 percent. As another example, the predefined threshold difference could lie in a range of 50 centimetres to 100 centimetres; more optionally, in a range of 50 centimetres to 200 centimetres.

When such a situation is detected, it is beneficial to skip activating the given portion of the active optical device (to decrease the transmission) altogether, or to activate the given portion of the active optical device to increase the transmission of the part of the real-world light field passing through the given portion of the transparent display towards the given eye. In particular, it may be advantageous to skip activating the given portion of the active optical device (to decrease the transmission) entirely, because each dimmed part of the real-world light field for the given eye of the given user potentially causes unintended dimming in other parts of the real-world light field for the other eye of the given user and/or for the eyes of the other user(s). While increasing the transmission of the part of the real-world light field (instead of decreasing the transmission) ensures that the real-world object in a region of interest of the user is visible to the user as clearly as possible. Otherwise, when it is detected that said difference is not greater than the predefined threshold difference, the given portion of the active optical device is activated to decrease the transmission, as mentioned earlier.

Optionally, the system further comprises an ambient light sensor, wherein the at least one processor is configured to:
determine an average intensity of the real-world light field by utilising the ambient light sensor;
detect when the average intensity of the real-world light field is greater than a predefined threshold intensity; and
when it is detected that the average intensity of the real-world light field is greater than the predefined threshold intensity, activate an entirety of the active optical device to decrease the transmission of the real-world light field passing through the entirety of the active optical device towards the transparent display.

The ambient light sensor is arranged facing the real-world light field. In this regard, the average intensity of the real-world light field can be determined in lux values. The predefined threshold intensity may, for example, lie in a range of 10000 lux to 25000 lux. Examples of the ambient light sensor include, but are not limited to, a phototransistor, a photodiode, a photoresistor, and a photonic integrated circuit. In some implementations, the ambient light sensor may also be implemented as the at least one real-world-facing camera, wherein intensity values of pixels in images captured by the at least one real-world-facing camera can be combined to determine the average intensity of the real-world light field.

Advantageously, by activating the entirety of the active optical device to decrease the transmission of the real-world light field passing through the entirety of the active optical device, it can be ensured that the at least one user is able to see the at least one virtual object clearly even in a bright outdoor environment. Otherwise, when it is detected that the average intensity of the real-world light field is not greater than the predefined threshold intensity, the given portion of the active optical device can be selectively activated to decrease the transmission, as mentioned earlier.

Optionally, the at least one processor is configured to:
determine at least one additional portion of the active optical device through which a real-world glare is passing towards a given eye of the at least one user; and
activate the at least one additional portion of the active optical device to decrease a transmission of the real-world glare passing through the at least one additional portion of the active optical device towards the given eye.

It will be appreciated that the aforementioned steps can be performed per each viewpoint, namely, for each eye of each user. A technical benefit of activating the at least one additional portion of the active optical device to decrease the transmission of the real-world glare is that a comfortable viewing experience is facilitated to the at least one user. In this regard, the at least one additional portion of the active optical device through which the real-world glare is passing towards the given eye can be determined accurately by:
utilising the at least one real-world-facing camera to capture at least one 2D real-world image of the real-world environment,
reprojecting the at least one 2D real-world image from the perspective of the at least one real-world-facing camera to the perspective of a viewpoint of the given eye,
identifying at least one image segment in a reprojected version of the at least one 2D real-world image that represents the real-world glare, based on intensity values of pixels in the at least one image segment and optionally a shape of the at least one image segment, and mapping viewing directions of the pixels in the at least one image segment from the given eye with a viewing direction of the at least one additional portion of the active optical device from the given eye.

In this regard, the at least one image segment can be identified as an image segment whose pixels' intensity values are higher than a predefined threshold intensity. The predefined threshold intensity may, for example, lie in a range of 200 to 255, for a 8-bit representation of the pixels. The at least one image segment may also be identified based on its shape, because real-world glare are known to often occur in certain shapes. This may depend on an environmental condition in which the system is being used currently. For example, in a bright outdoor environment, the real-world glare may be due to the Sun rays being reflected from a reflective surface. In such a case, the real-world glare may have a typical star-like shape. Moreover, in most situations, the real-world glare is coming from a significant distance. Thus, even without reprojection, an incoming direction of the real-world glare is essentially the same for the at least one real-world-facing camera and the at least one user, even though they are at different positions. This is because a difference between a location of the given eye and a location of the at least one real-world-facing camera is insignificant when compared to a distance of a source of the real-world glare (for example, such as the Sun, reflections from other vehicles, etc.) from the at least one real-world-facing camera. It will be appreciated that the at least one additional portion of the active optical device could be overlapping with the remaining portion of the transparent display (where no virtual object is being displayed) or even with the given portion of the transparent display (where the at least one virtual object is being displayed).

Optionally, the active optical device comprises a direction-dependent transmission reduction layer, wherein the transmission of the part of the real-world light field passing through the given portion of the active optical device towards a given eye is decreased, based on a relative location of the given eye with respect to the transparent display. When the part of the real-world light field is incident on the direction-dependent transmission reduction layer, the transmission of said part of the real-world light field is decreased only along the viewing direction of the given eye of the given user. This is highly advantageous, as a dimmed part of the real-world light field for the given eye of the given user does not cause any unintended dimming in other parts of the real-world light field for the other eye of the given user and/or for the eyes of the other user(s). Notably, without such a direction-dependent transmission reduction layer, each dimmed part of the real-world light field for the given eye of the given user potentially causes unintended dimming in other parts of the real-world light field for the other eye of the given user and/or for the eyes of the other user(s). This has been illustrated in conjunction with FIGS. 3B and 3C. The direction-dependent transmission reduction layer can be implemented in various ways. As an example, said layer could be implemented as a tuning liquid crystal matrix, wherein alignment of liquid crystal molecules in different portion of said matrix can be electrically controlled to partially block light incident from along the viewing direction of the given eye, while allowing passage of light toward the other eye of the given user and/or the eyes of the other user(s).

Moreover, optionally, the at least one user comprises a plurality of users, wherein the at least one processor is configured to:

utilise the tracking means to determine respective gaze directions of eyes of the plurality of users;

determine, based on the respective gaze directions, respective gaze portions of the transparent display for the plurality of users;

detect when a first gaze portion of the transparent display for a first user overlaps with a second gaze portion of the transparent display for the a second user, and the first gaze portion and the second gaze portion overlap with the given portion of the transparent display whereat said union of the at least one first image segment and the at least one second image segment is to be presented; and when it is detected that the first gaze portion overlaps with the second gaze portion, and the first gaze portion and the second gaze portion overlap with the given portion of the transparent display, determine respective optical depths at which the first user and the second user are gazing, based on respective gaze directions of eyes of the first user and the second user;

detect, based on the respective optical depths at which the first user and the second user are gazing and an optical depth at which the at least one virtual object is being presented, when the first user is gazing at the real-world environment through the first gaze portion of the transparent display, while the second user is gazing at the at least one virtual object being presented at the second gaze portion of the transparent display; and when it is detected that the first user is gazing at the real-world environment through the first gaze portion of the transparent display, while the second user is gazing at the at least one virtual object being presented at the second gaze portion of the transparent display, deactivate a first portion of the controllable parallax barrier that corresponds to the first gaze portion of the transparent display.

When the first gaze portion and the second gaze portion overlap with the given portion of the transparent display, this means that the first gaze portion and the second gaze portion are presenting the at least one virtual object to the first user and the second user, respectively. When it is detected that the first user is gazing at the real-world environment through the first gaze portion of the transparent display (that is, the first user is not gazing at the at least one virtual object being presented by the first gaze portion), while the second user is gazing at the at least one virtual object being presented by the second gaze portion of the transparent display, the first portion of the controllable parallax barrier is deactivated to present the at least one virtual object to the second user without any parallax barrier effect. In addition, the at least one virtual object is presented at an optical depth that is similar to the native optical depth of the transparent display from the second user. In such a case, there is no need for displaying different virtual images to the first eye and the second eye of the second user. In other words, a same virtual image is displayed to both the eyes of the second user. A technical benefit of deactivating the first portion of the controllable parallax barrier in such a situation is that the second user is still able to perceive the at least one virtual object (although at the optical depth that is similar to the native optical depth), while the first user is able to see the real-world environment without any ghosting artefacts.

The present disclosure also relates to the method as described above. Various embodiments and variants disclosed above, with respect to the aforementioned first aspect, apply mutatis mutandis to the method.

Optionally, the step of controlling the controllable parallax barrier further comprises deactivating a remaining portion of the controllable parallax barrier.

Moreover, optionally, the method further comprises:
utilising at least one real-world-facing camera to capture at least one 2D real-world image of a real-world environment;
generating at least one synthetic 2D image corresponding to a given eye of the at least one user by utilising the at least one 2D real-world image, based on a relative location of the given eye with respect to the transparent display, wherein the at least one synthetic 2D image represents at least one real-world object in the real-world environment from a perspective of the given eye; and
generating the light field image by utilising the first virtual image and the second virtual image representing the at least one virtual object and the at least one synthetic 2D image representing the at least one real-world object, wherein the step of generating the light field image comprises:
generating a region of the light field image that corresponds to said union, based on the at least one first image segment in the first virtual image and the at least one second image segment in the second virtual image that correspond to the at least one virtual object; and
generating at least a part of a remaining region of the light field image, based on the at least one synthetic 2D image representing the at least one real-world object.

Furthermore, optionally, the method further comprises determining an amount of attenuation caused by the controllable parallax barrier to a real-world light field at a remaining portion of the controllable parallax barrier, wherein the step of generating at least the part of the remaining region of the light field image comprises generating intensity values for said part of the remaining region of the light field image, based on the amount of attenuation caused.

Optionally, the method further comprises:
utilising the tracking means to determine gaze directions of the first eye and the second eye of the at least one user;
detecting, based on the gaze directions, when the at least one user is gazing through the given portion of the transparent display; and
when it is detected that the at least one user is gazing through the given portion of the transparent display, performing any one of:
skipping generating the at least one synthetic 2D image representing the at least one real-world object, or
generating the at least one synthetic 2D image at a second resolution that is lower than a first resolution, wherein a given synthetic 2D image is generated at the first resolution when it is detected that the at least one user is gazing through a remaining portion of the transparent display.

Moreover, optionally, the method further comprises:
determining a given portion of an active optical device that corresponds to the given portion of the transparent display whereat said union of the at least one first image segment and the at least one second image segment is to be presented, the active optical device being arranged on an optical path of a real-world light field; and
activating the given portion of the active optical device to decrease a transmission of a part of the real-world light field passing through the given portion of the active optical device towards the given portion of the transparent display.

Optionally, the method further comprises:
utilising the tracking means to determine gaze directions of the first eye and the second eye of the at least one user;
determining, based on the gaze directions, a gaze portion of the transparent display;
detecting when the gaze portion of the transparent display does not overlap with the given portion of the transparent display whereat said union of the at least one first image segment and the at least one second image segment is to be presented; and
when it is detected that the gaze portion of the transparent display does not overlap with the given portion of the transparent display, skipping activating the given portion of the active optical device to decrease the transmission.

Optionally, the method further comprises:
utilising the tracking means to determine gaze directions of the first eye and the second eye of the at least one user;
determining an optical depth at which the at least one user is gazing, based on the gaze directions;
detecting when a difference between the optical depth at which the at least one user is gazing and an optical depth at which the at least one virtual object is being presented is greater than a predefined threshold difference; and
when it is detected that said difference is greater than the predefined threshold difference, performing any one of:
skipping activating the given portion of the active optical device to decrease the transmission, or
activating the given portion of the active optical device to increase the transmission of the part of the real-world light field passing through the given portion of the active optical device towards the given portion of the transparent display.

Optionally, the method further comprises:
determining an average intensity of the real-world light field by utilising an ambient light sensor;
detecting when the average intensity of the real-world light field is greater than a predefined threshold intensity; and
when it is detected that the average intensity of the real-world light field is greater than the predefined threshold intensity, activating an entirety of the active optical device to decrease the transmission of the real-world light field passing through the entirety of the active optical device towards the transparent display.

Optionally, the method further comprises:
determining at least one additional portion of the active optical device through which a real-world glare is passing towards a given eye of the at least one user; and
activating the at least one additional portion of the active optical device to decrease a transmission of the real-world glare passing through the at least one additional portion of the active optical device towards the given eye.

Optionally, in the method, the active optical device comprises a direction-dependent transmission reduction layer, wherein the transmission of the part of the real-world light field passing through the given portion of the active optical device towards a given eye is decreased, based on a relative location of the given eye with respect to the transparent display.

Furthermore, optionally, the at least one user comprises a plurality of users, wherein the method further comprises:
  utilising the tracking means to determine respective gaze directions of eyes of the plurality of users;
  determining, based on the respective gaze directions, respective gaze portions of the transparent display for the plurality of users;
  detecting when a first gaze portion of the transparent display for a first user overlaps with a second gaze portion of the transparent display for the a second user, and the first gaze portion and the second gaze portion overlap with the given portion of the transparent display whereat said union of the at least one first image segment and the at least one second image segment is to be presented; and
  when it is detected that the first gaze portion overlaps with the second gaze portion, and the first gaze portion and the second gaze portion overlap with the given portion of the transparent display,
    determining respective optical depths at which the first user and the second user are gazing, based on respective gaze directions of eyes of the first user and the second user;
    detecting, based on the respective optical depths at which the first user and the second user are gazing and an optical depth at which the at least one virtual object is being presented, when the first user is gazing at a real-world environment through the first gaze portion of the transparent display, while the second user is gazing at the at least one virtual object being presented at the second gaze portion of the transparent display; and
  when it is detected that the first user is gazing at the real-world environment through the first gaze portion of the transparent display, while the second user is gazing at the at least one virtual object being presented at the second gaze portion of the transparent display, deactivating a first portion of the controllable parallax barrier that corresponds to the first gaze portion of the transparent display.

DETAILED DESCRIPTION OF THE DRAWINGS

Figure 1B:
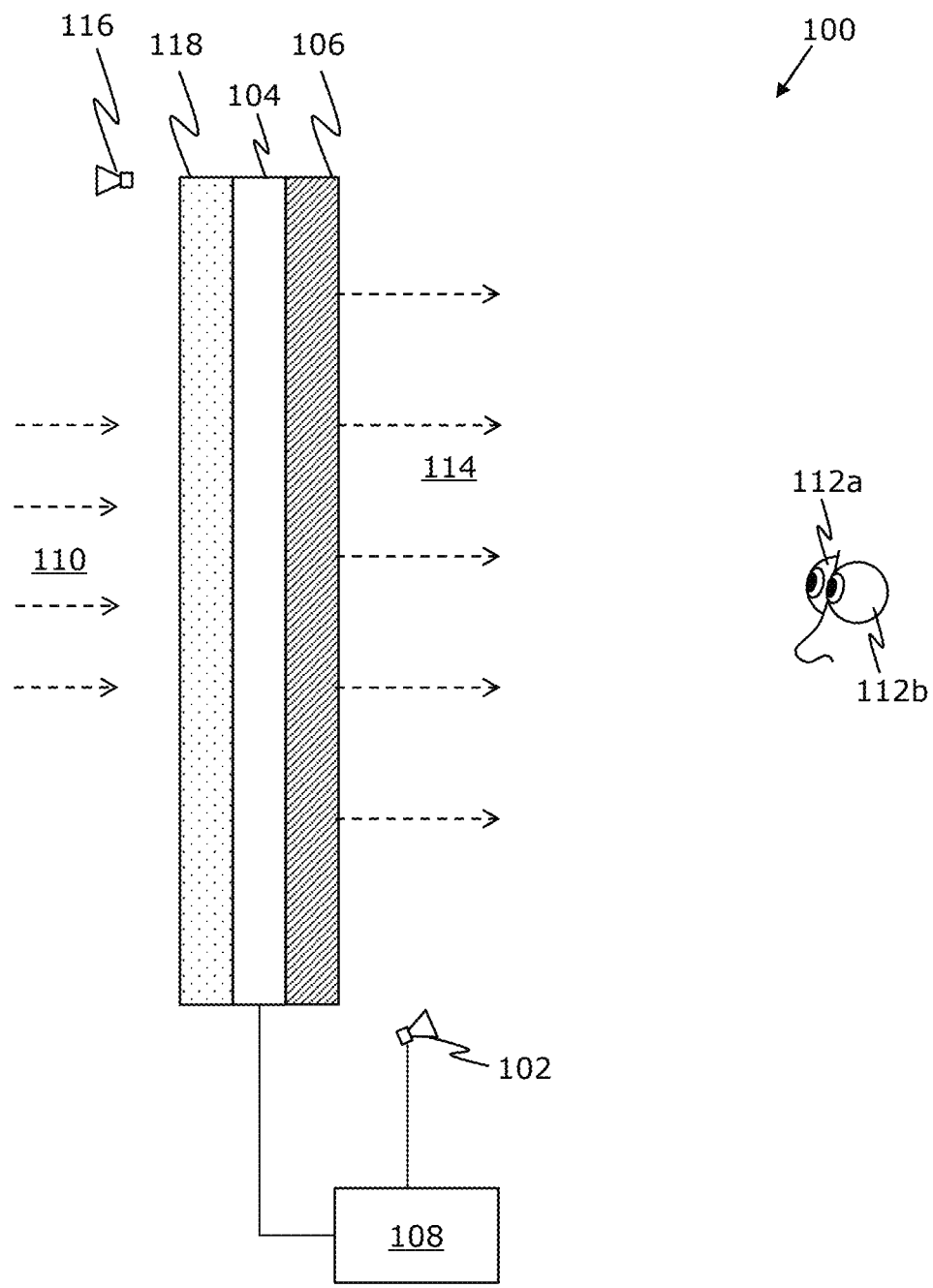

Referring to FIGS. 1A and 1B, illustrated are example implementations of a system 100 for augmenting reality using a multiscopic see-through display, in accordance with different embodiments of the present disclosure. With reference to FIGS. 1A and 1B, the system 100 comprises tracking means 102, a transparent display 104, a controllable parallax barrier 106 arranged on an optical path of the transparent display 104, and at least one processor (depicted as a processor 108). The transparent display 104 and the controllable parallax barrier 106 constitute the multiscopic see-through display, which allows a real-world light field 110 (emanating from a real-world environment) to pass through towards a first eye 112a and a second eye 112b of at least one user.

The processor 108 is configured to:
  utilise the tracking means 102 to determine a relative location of the first eye 112a and of the second eye 112b of the at least one user with respect to the transparent display 104;
  retrieve or generate a first virtual image and a second virtual image representing at least one virtual object from a perspective of the first eye 112a and the second eye 112b of the at least one user, based on the relative location of the first eye 112a and of the second eye 112b of the at least one user with respect to the transparent display 104, respectively;
  determine a union of at least one first image segment in the first virtual image and at least one second image segment in the second virtual image that represent the at least one virtual object;
  determine a given portion of the transparent display 104 whereat said union of the at least one first image segment and the at least one second image segment is to be presented; and
  display a light field image via the transparent display 104, whilst controlling the controllable parallax barrier 106, based on the relative location of the first eye 112a and of the second eye 112b of the at least one user with respect to the transparent display 104, to direct light 114 produced by a first set of pixels and a second set of pixels of the light field image towards the first eye 112a and the second eye 112b, respectively, the first set of pixels being generated from the at least one first image segment in the first virtual image, the second set of pixels being generated from the at least one second image segment in the second virtual image,
  wherein, when controlling the controllable parallax barrier 106, the processor 108 is configured to activate a given portion of the controllable parallax barrier 106 that corresponds to the given portion of the transparent display 104.

With reference to FIG. 1B, optionally, the system 100 further comprises at least one real-world-facing camera (depicted as a real-world-facing camera 116), wherein the processor 108 is configured to:
  utilise the real-world-facing camera 116 to capture at least one 2D real-world image of the real-world environment;
  generate at least one synthetic 2D image corresponding to a given eye 112a-b of the at least one user by utilising the at least one 2D real-world image, based on a relative location of the given eye 112a-b with respect to the transparent display 104, wherein the at least one synthetic 2D image represents at least one real-world object in the real-world environment from a perspective of the given eye 112a-b; and
  generate the light field image by utilising the first virtual image and the second virtual image representing the at least one virtual object and the at least one synthetic 2D image representing the at least one real-world object, wherein when generating the light field image, the processor 108 is configured to:
    generate a region of the light field image that corresponds to said union, based on the at least one first image segment in the first virtual image and the at least one second image segment in the second virtual image that correspond to the at least one virtual object; and
    generate at least a part of a remaining region of the light field image, based on the at least one synthetic 2D image representing the at least one real-world object.

Moreover, optionally, the system 100 further comprises an active optical device 118 arranged on an optical path of the real-world light field 110, wherein the processor 108 is configured to:
  determine a given portion of the active optical device 118 that corresponds to the given portion of the transparent display 104 whereat said union of the at least one first image segment and the at least one second image segment is to be presented; and activate the given portion of the active optical device 118 to decrease a transmission of a part of the real-world light field 110 passing through the given portion of the active optical device 118 towards the given portion of the transparent display 104.

It may be understood by a person skilled in the art that FIGS. 1A and 1B include simplified example implementations of the system 100, for sake of clarity, which should not unduly limit the scope of the claims herein. It is to be understood that a specific implementation of the system 100 is not to be construed as limiting it to specific numbers or types of tracking means, transparent displays, controllable parallax barriers, active optical devices, real-world-facing cameras, and processors. A person skilled in the art will recognize many variations, alternatives, and modifications of embodiments of the present disclosure.

Figure 2:
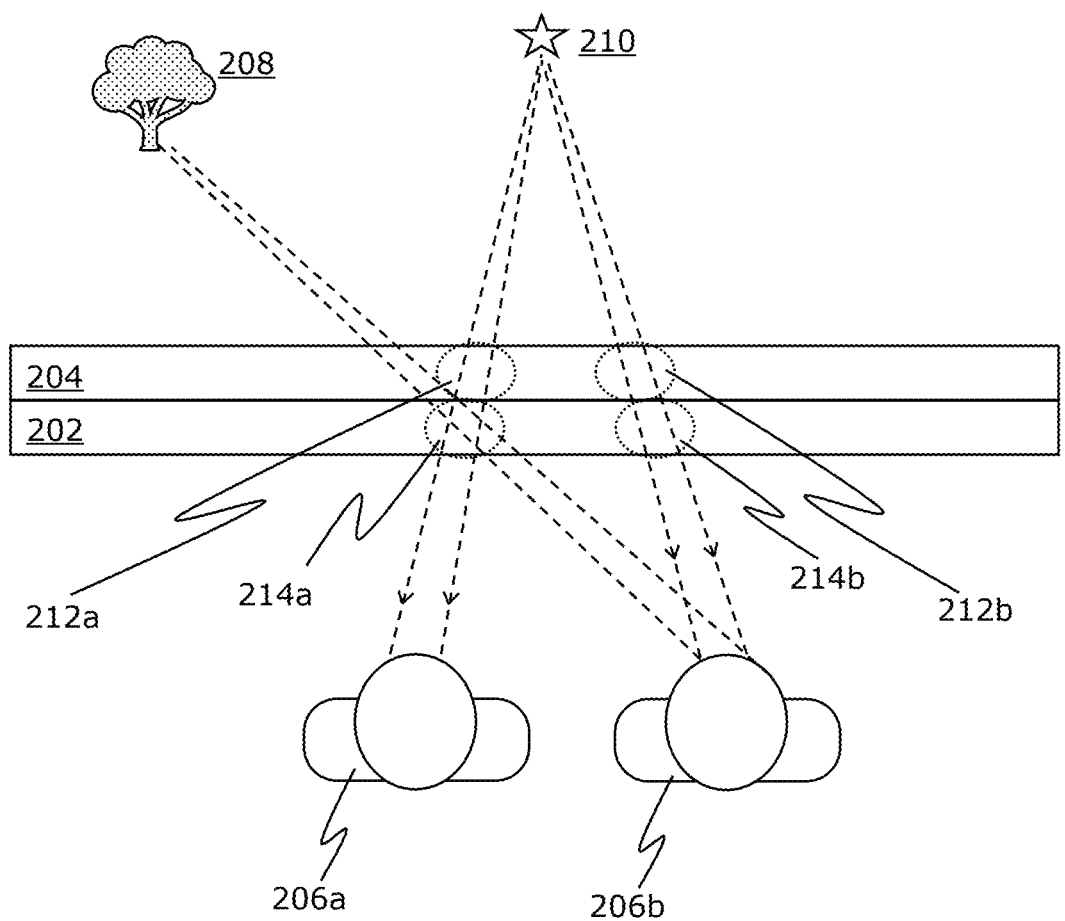
FIG. 2 illustrates how a given portion of a controllable parallax barrier that has been activated for a given user potentially causes ghosting artefacts in a part of a real-world light field for another user, in accordance with an embodiment of the present disclosure.

FIG. 2 illustrates how a given portion of a controllable parallax barrier 202 (arranged on an optical path of a transparent display 204) that has been activated for a given user 206a potentially causes ghosting artefacts in a part of a real-world light field for another user 206b, in accordance with an embodiment of the present disclosure. The controllable parallax barrier 202 and the transparent display 204 are employed to optically combine the real-world light field with a synthetic light field produced by the transparent display 204. The real-world light field is representative of at least one real-world object, depicted as a real-world object 208 (shown as a trees, for illustration purposes only) present in a real-world environment. The synthetic light field presents at least one virtual object, depicted as a virtual object 210 (shown as a star, for illustration purposes only).

As shown, the same virtual object 210 is presented through different portions 212a and 212b of the transparent display 204 to the given user 206a and the another user 206b, respectively. Light emanating from the portion 212a of the transparent display 204 and light emanating from the portion 212b of the transparent display 204 pass through different portions 214a and 214b of the controllable parallax barrier 202, respectively. These portions 214a and 214b of the controllable parallax barrier 202 are activated to produce a parallax barrier effect. For sake of clarity and illustration purposes only, a shape of the aforesaid portions 212a-b and 214a-b has been shown as an ellipse; it will be appreciated that in actual usage, these portions would have shapes that are similar to a shape of the virtual object 210.

When the portion 214a of the controllable parallax barrier 202 is activated to produce the parallax barrier effect for the given user 206a, ghosting artefact is unintentionally produced for the another user 206b.

As a result, the real-world object 208 appears with said ghosting artefact to the another user 206b. Therefore, pursuant to embodiments of the present disclosure, the portions 214a-214b of the controllable parallax barrier 202 are activated selectively. Meanwhile, a remaining portion of the controllable parallax barrier 202 may be beneficially deactivated to avoid ghosting artefacts.

Figure 3A:
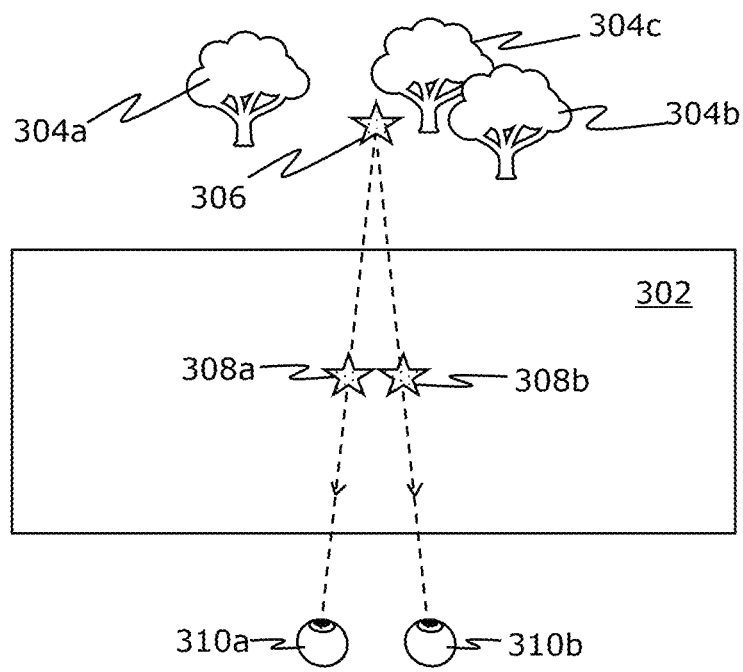
FIGS. 3A and 3B illustrate how a given portion of an active optical device that has been activated to decrease a transmission of a part of a real-world light field passing therethrough potentially causes unintended dimming in other parts of a real-world light field for another eye of the given user and similarly for eyes of other user(s), in accordance with an embodiment of the present disclosure.
Figure 3B:
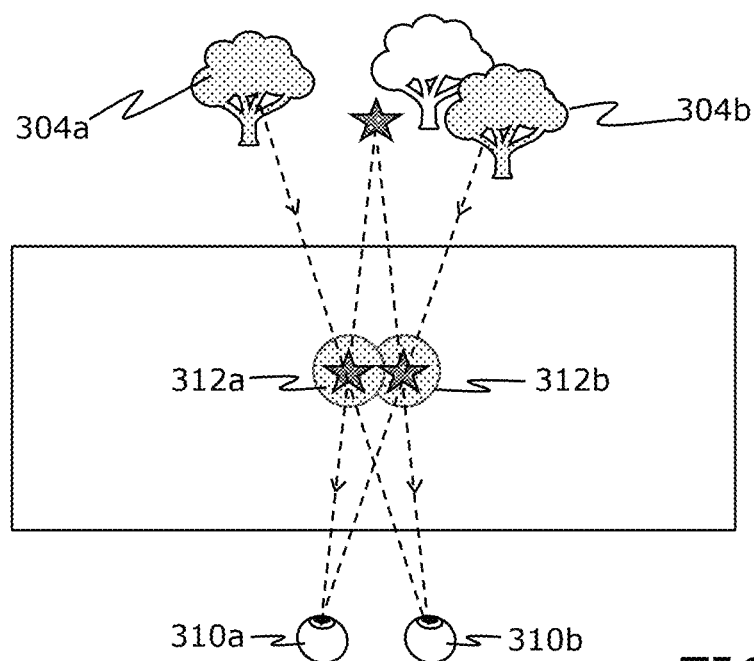

FIGS. 3A and 3B illustrate how a given portion of an active optical device that has been activated to decrease a transmission of a part of a real-world light field passing therethrough potentially causes unintended dimming in other parts of a real-world light field for another eye of the given user and similarly for eyes of other user(s), in accordance with an embodiment of the present disclosure. A controllable parallax barrier 302 is arranged on an optical path of a transparent display (not shown, for sake of simplicity). The controllable parallax barrier 302 and the transparent display are employed to optically combine the real-world light field with a synthetic light field produced by the transparent display. The active optical device (not shown, for sake of simplicity) is arranged on the optical path of the real-world light field.

The real-world light field is representative of at least one real-world object, depicted as real-world objects 304a-c (shown as three trees, for illustration purposes only) present in a real-world environment. The synthetic light field presents at least one virtual object, depicted as a virtual object 306 (shown as a star, for illustration purposes only). A first image segment 308a of a first virtual image and a second image segment 308b of a second virtual image present the virtual object 306 to a first eye 310a and a second eye 310b of a given user, respectively. As shown, the same virtual object 306 is presented through different portions of the transparent display, wherein light corresponding to the first image segment 308a and light corresponding to the second image segment 308b pass through different portions 312a and 312b of the controllable parallax barrier 302. These portions 312a and 312b of the controllable parallax barrier 302 are activated to provide a parallax barrier effect. For sake of clarity and illustration purposes only, a shape of these different portions 312a-b has been shown as a circle; it will be appreciated that in actual usage, these portions 312a-b would have shapes that are similar to a shape of the virtual object 306.

When a portion of the active optical device corresponding to the portion 312a of the controllable parallax barrier 302 is activated to decrease a transmission of a part of the real-world light field (passing through said portion of the active optical device), the first eye 310a is able to see the first virtual image clearly and with high contrast. However, this results in unintended dimming of another part of the real-world light field that pertains to the real-world object 304a for the second eye 310b. Similarly, when a portion of active optical device corresponding to the portion 312b of the controllable parallax barrier 302 is activated to decrease a transmission of a part of the real-world light field (passing through said portion of the active optical device), the second eye 310b is able to see the second virtual image clearly and with high contrast. However, this results in unintended dimming of yet another part of the real-world light field that pertains to the real-world object 304b for the first eye 310a. This technical problem is highly undesirable, and is only exacerbated when the same virtual object 306 is to be presented to multiple users simultaneously. As mentioned earlier, this problem can be mitigated in several ways, for example, upon detecting when a gaze portion of the transparent display for the given user does not overlap with a given portion of the transparent display whereat a union of the first image segment 308a and the second image segment 308b is to be presented, and/or upon detecting when a difference between an optical depth at which the given user is gazing and an optical depth at which the virtual object 306 is being presented is greater than a predefined threshold difference.

Figure 3C:
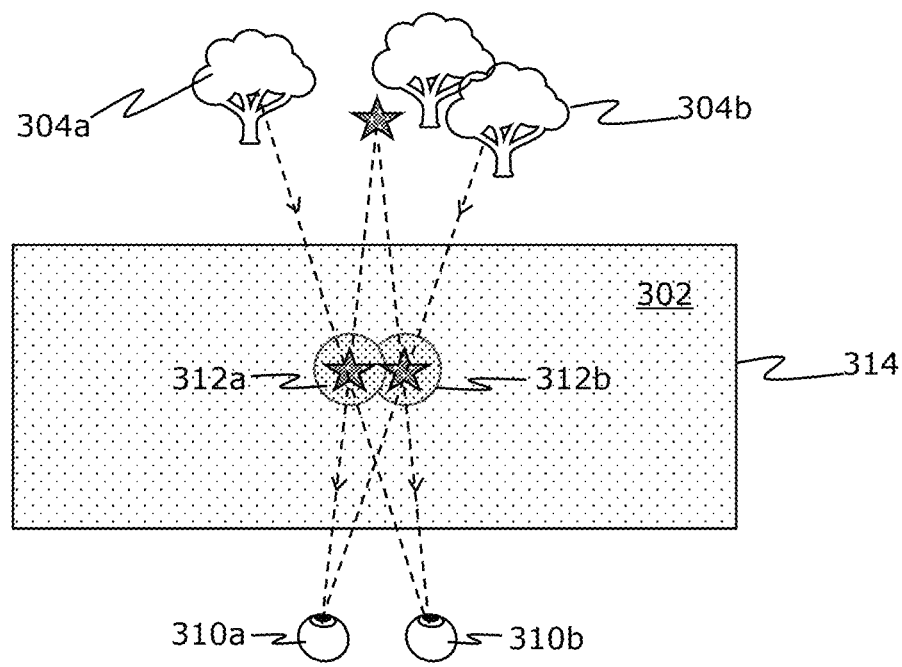
FIG. 3C illustrates how direction-dependent transmission reduction can prevent unintended dimming, in accordance with a specific embodiment of the present disclosure.

FIG. 3C illustrates how direction-dependent transmission reduction can prevent unintended dimming, in accordance with a specific embodiment of the present disclosure. The active optical device comprises a direction-dependent transmission reduction layer 314, as shown. The transmission of the part of the real-world light field (passing through the portion of the active optical device that corresponds to the portion 312a of the controllable parallax barrier 302)

towards the first eye 310a is decreased for a viewing direction of the first eye 310a only. Likewise, the transmission of the part of the real-world light field (passing through the portion of the active optical device that corresponds to the portion 312b of the controllable parallax barrier 302) towards the second eye 310b is decreased for a viewing direction of the second eye 310b only. As a result, the first eye 310a and the second eye 310b are able to see the real-world object 304b and the real-world object 304a, respectively, without any unintended dimming.

FIGS. 2 and 3A-3C are merely examples, which should not unduly limit the scope of the claims herein. A person skilled in the art will recognize many variations, alternatives, and modifications of embodiments of the present disclosure.

Figure 4:
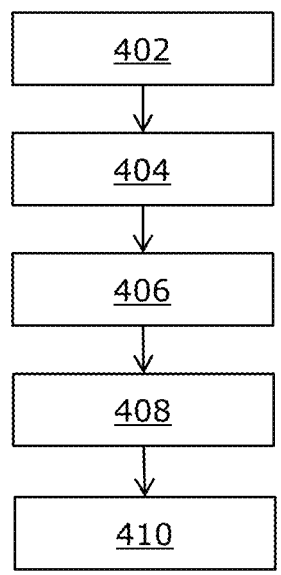
FIG. 4 illustrates steps of a method for augmenting reality using a multiscopic see-through display, in accordance with an embodiment of the present disclosure.

Referring to FIG. 4, illustrated are steps of a method for augmenting reality using a multiscopic see-through display, in accordance with different embodiments of the present disclosure. At step 402, tracking means is utilised to determine a relative location of a first eye and of a second eye of at least one user with respect to a transparent display. At step 404, a first virtual image and a second virtual image representing at least one virtual object from a perspective of the first eye and the second eye of the at least one user is retrieved or generated, based on the relative location of the first eye and of the second eye of the at least one user with respect to the transparent display, respectively. At step 406, a union of at least one first image segment in the first virtual image and at least one second image segment in the second virtual image that represent the at least one virtual object is determined. At step 408, a given portion of the transparent display whereat said union of the at least one first image segment and the at least one second image segment is to be presented is determined. At step 410, a light field image is displayed via the transparent display, whilst a controllable parallax barrier arranged on an optical path of the transparent display is controlled, based on the relative location of the first eye and of the second eye of the at least one user with respect to the transparent display, to direct light produced by a first set of pixels and a second set of pixels of the light field image towards the first eye and the second eye, respectively, the first set of pixels being generated from the at least one first image segment in the first virtual image, the second set of pixels being generated from the at least one second image segment in the second virtual image. In accordance with step 410, the step of controlling the controllable parallax barrier comprises activating a given portion of the controllable parallax barrier that corresponds to the given portion of the transparent display.

The aforementioned steps are only illustrative and other alternatives can also be provided where one or more steps are added, one or more steps are removed, or one or more steps are provided in a different sequence without departing from the scope of the claims herein.

The invention claimed is:

1. A system comprising:
    tracking means;
    a transparent display;
    a controllable parallax barrier arranged on an optical path of the transparent display; and
    at least one processor configured to:
        utilise the tracking means to determine a relative location of a first eye and of a second eye of at least one user with respect to the transparent display;
        retrieve or generate a first virtual image and a second virtual image representing at least one virtual object from a perspective of the first eye and the second eye of the at least one user, based on the relative location of the first eye and of the second eye of the at least one user with respect to the transparent display, respectively;
        determine a union of at least one first image segment in the first virtual image and at least one second image segment in the second virtual image that represent the at least one virtual object;
        determine a given portion of the transparent display whereat said union of the at least one first image segment and the at least one second image segment is to be presented; and
        display a light field image via the transparent display, whilst controlling the controllable parallax barrier, based on the relative location of the first eye and of the second eye of the at least one user with respect to the transparent display, to direct light produced by a first set of pixels and a second set of pixels of the light field image towards the first eye and the second eye, respectively, the first set of pixels being generated from the at least one first image segment in the first virtual image, the second set of pixels being generated from the at least one second image segment in the second virtual image,
    wherein, when controlling the controllable parallax barrier, the at least one processor is configured to activate a given portion of the controllable parallax barrier that corresponds to the given portion of the transparent display.

2. The system of claim 1, wherein when controlling the controllable parallax barrier, the at least one processor is configured to deactivate a remaining portion of the controllable parallax barrier.

3. The system of claim 1, further comprising at least one real-world-facing camera, wherein the at least one processor is configured to:
    utilise the at least one real-world-facing camera to capture at least one two-dimensional real-world image of a real-world environment;
    generate at least one synthetic 2D image corresponding to a given eye of the at least one user by utilising the at least one 2D real-world image, based on a relative location of the given eye with respect to the transparent display, wherein the at least one synthetic 2D image represents at least one real-world object in the real-world environment from a perspective of the given eye; and
    generate the light field image by utilising the first virtual image and the second virtual image representing the at least one virtual object and the at least one synthetic 2D image representing the at least one real-world object, wherein when generating the light field image, the at least one processor is configured to:
        generate a region of the light field image that corresponds to said union, based on the at least one first image segment in the first virtual image and the at least one second image segment in the second virtual image that correspond to the at least one virtual object; and
        generate at least a part of a remaining region of the light field image, based on the at least one synthetic 2D image representing the at least one real-world object.

4. The system of claim 3, wherein the at least one processor is configured to:
    determine an amount of attenuation caused by the controllable parallax barrier to a real-world light field at a remaining portion of the controllable parallax barrier; and when generating at least the part of the remaining region of the light field image, generate intensity values for said part of the remaining region of the light field image, based on the amount of attenuation caused.

5. The system of claim 3, wherein the at least one processor is configured to:
  utilise the tracking means to determine gaze directions of the first eye and the second eye of the at least one user;
  detect, based on the gaze directions, when the at least one user is gazing through the given portion of the transparent display; and
  when it is detected that the at least one user is gazing through the given portion of the transparent display, perform any one of:
    skip generating the at least one synthetic 2D image representing the at least one real-world object, or
    generate the at least one synthetic 2D image at a second resolution that is lower than a first resolution, wherein a given synthetic 2D image is generated at the first resolution when it is detected that the at least one user is gazing through a remaining portion of the transparent display.

6. The system of claim 1, further comprising an active optical device arranged on an optical path of a real-world light field, wherein the at least one processor is configured to:
  determine a given portion of the active optical device that corresponds to the given portion of the transparent display whereat said union of the at least one first image segment and the at least one second image segment is to be presented; and
  activate the given portion of the active optical device to decrease a transmission of a part of the real-world light field passing through the given portion of the active optical device towards the given portion of the transparent display.

7. The system of claim 6, wherein the at least one processor is configured to:
  utilise the tracking means to determine gaze directions of the first eye and the second eye of the at least one user;
  determine, based on the gaze directions, a gaze portion of the transparent display;
  detect when the gaze portion of the transparent display does not overlap with the given portion of the transparent display whereat said union of the at least one first image segment and the at least one second image segment is to be presented; and
  when it is detected that the gaze portion of the transparent display does not overlap with the given portion of the transparent display, skip activating the given portion of the active optical device to decrease the transmission.

8. The system of claim 6, wherein the at least one processor is configured to:
  utilise the tracking means to determine gaze directions of the first eye and the second eye of the at least one user;
  determine an optical depth at which the at least one user is gazing, based on the gaze directions;
  detect when a difference between the optical depth at which the at least one user is gazing and an optical depth at which the at least one virtual object is being presented is greater than a predefined threshold difference; and
  when it is detected that said difference is greater than the predefined threshold difference, perform any one of:
    skip activating the given portion of the active optical device to decrease the transmission, or
    activate the given portion of the active optical device to increase the transmission of the part of the real-world light field passing through the given portion of the active optical device towards the given portion of the transparent display.

9. The system of claim 6, further comprising an ambient light sensor, wherein the at least one processor is configured to:
  determine an average intensity of the real-world light field by utilising the ambient light sensor;
  detect when the average intensity of the real-world light field is greater than a predefined threshold intensity; and
  when it is detected that the average intensity of the real-world light field is greater than the predefined threshold intensity, activate an entirety of the active optical device to decrease the transmission of the real-world light field passing through the entirety of the active optical device towards the transparent display.

10. The system of claim 6, wherein the at least one processor is configured to:
  determine at least one additional portion of the active optical device through which a real-world glare is passing towards a given eye of the at least one user; and
  activate the at least one additional portion of the active optical device to decrease a transmission of the real-world glare passing through the at least one additional portion of the active optical device towards the given eye.

11. The system of claim 6, wherein the active optical device comprises a direction-dependent transmission reduction layer, wherein the transmission of the part of the real-world light field passing through the given portion of the active optical device towards a given eye is decreased, based on a relative location of the given eye with respect to the transparent display.

12. The system of claim 1, wherein the at least one user comprises a plurality of users, wherein the at least one processor is configured to:
  utilise the tracking means to determine respective gaze directions of eyes of the plurality of users;
  determine, based on the respective gaze directions, respective gaze portions of the transparent display for the plurality of users;
  detect when a first gaze portion of the transparent display for a first user overlaps with a second gaze portion of the transparent display for the a second user, and the first gaze portion and the second gaze portion overlap with the given portion of the transparent display whereat said union of the at least one first image segment and the at least one second image segment is to be presented; and
  when it is detected that the first gaze portion overlaps with the second gaze portion, and the first gaze portion and the second gaze portion overlap with the given portion of the transparent display,
    determine respective optical depths at which the first user and the second user are gazing, based on respective gaze directions of eyes of the first user and the second user;
    detect, based on the respective optical depths at which the first user and the second user are gazing and an optical depth at which the at least one virtual object is being presented, when the first user is gazing at a real-world environment through the first gaze portion of the transparent display, while the second user is gazing at the at least one virtual object being presented at the second gaze portion of the transparent display; and when it is detected that the first user is gazing at the real-world environment through the first gaze portion of the transparent display, while the second user is gazing at the at least one virtual object being presented at the second gaze portion of the transparent display, deactivate a first portion of the controllable parallax barrier that corresponds to the first gaze portion of the transparent display.

13. A method comprising:
utilising tracking means to determine a relative location of a first eye and of a second eye of at least one user with respect to a transparent display;
retrieving or generating a first virtual image and a second virtual image representing at least one virtual object from a perspective of the first eye and the second eye of the at least one user, based on the relative location of the first eye and of the second eye of the at least one user with respect to the transparent display, respectively;
determining a union of at least one first image segment in the first virtual image and at least one second image segment in the second virtual image that represent the at least one virtual object;
determining a given portion of the transparent display whereat said union of the at least one first image segment and the at least one second image segment is to be presented; and
displaying a light field image via the transparent display, whilst controlling a controllable parallax barrier arranged on an optical path of the transparent display, based on the relative location of the first eye and of the second eye of the at least one user with respect to the transparent display, to direct light produced by a first set of pixels and a second set of pixels of the light field image towards the first eye and the second eye, respectively, the first set of pixels being generated from the at least one first image segment in the first virtual image, the second set of pixels being generated from the at least one second image segment in the second virtual image,
wherein the step of controlling the controllable parallax barrier comprises activating a given portion of the controllable parallax barrier that corresponds to the given portion of the transparent display.

14. The method of claim 13, further comprising:
utilising at least one real-world-facing camera to capture at least one two-dimensional real-world image of a real-world environment;
generating at least one synthetic 2D image corresponding to a given eye of the at least one user by utilising the at least one 2D real-world image, based on a relative location of the given eye with respect to the transparent display, wherein the at least one synthetic 2D image represents at least one real-world object in the real-world environment from a perspective of the given eye; and
generating the light field image by utilising the first virtual image and the second virtual image representing the at least one virtual object and the at least one synthetic 2D image representing the at least one real-world object, wherein the step of generating the light field image comprises:
generating a region of the light field image that corresponds to said union, based on the at least one first image segment in the first virtual image and the at least one second image segment in the second virtual image that correspond to the at least one virtual object; and
generating at least a part of a remaining region of the light field image, based on the at least one synthetic 2D image representing the at least one real-world object.

15. The method of claim 14, further comprising determining an amount of attenuation caused by the controllable parallax barrier to a real-world light field at a remaining portion of the controllable parallax barrier,
wherein the step of generating at least the part of the remaining region of the light field image comprises generating intensity values for said part of the remaining region of the light field image, based on the amount of attenuation caused.

16. The method of claim 13, further comprising:
determining a given portion of an active optical device that corresponds to the given portion of the transparent display whereat said union of the at least one first image segment and the at least one second image segment is to be presented, the active optical device being arranged on an optical path of a real-world light field; and
activating the given portion of the active optical device to decrease a transmission of a part of the real-world light field passing through the given portion of the active optical device towards the given portion of the transparent display.

17. The method of claim 16, further comprising:
utilising the tracking means to determine gaze directions of the first eye and the second eye of the at least one user;
determining, based on the gaze directions, a gaze portion of the transparent display;
detecting when the gaze portion of the transparent display does not overlap with the given portion of the transparent display whereat said union of the at least one first image segment and the at least one second image segment is to be presented; and
when it is detected that the gaze portion of the transparent display does not overlap with the given portion of the transparent display, skipping activating the given portion of the active optical device to decrease the transmission.

18. The method of claim 16, further comprising:
utilising the tracking means to determine gaze directions of the first eye and the second eye of the at least one user;
determining an optical depth at which the at least one user is gazing, based on the gaze directions;
detecting when a difference between the optical depth at which the at least one user is gazing and an optical depth at which the at least one virtual object is being presented is greater than a predefined threshold difference; and
when it is detected that said difference is greater than the predefined threshold difference, performing any one of:
skipping activating the given portion of the active optical device to decrease the transmission, or
activating the given portion of the active optical device to increase the transmission of the part of the real-world light field passing through the given portion of the active optical device towards the given portion of the transparent display.

19. The method of claim 16, further comprising:
determining an average intensity of the real-world light field by utilising an ambient light sensor;
detecting when the average intensity of the real-world light field is greater than a predefined threshold intensity; and
when it is detected that the average intensity of the real-world light field is greater than the predefined threshold intensity, activating an entirety of the active optical device to decrease the transmission of the real-world light field passing through the entirety of the active optical device towards the transparent display.

20. The method of claim 13, wherein the at least one user comprises a plurality of users, wherein the method further comprises:
utilising the tracking means to determine respective gaze directions of eyes of the plurality of users;
determining, based on the respective gaze directions, respective gaze portions of the transparent display for the plurality of users;
detecting when a first gaze portion of the transparent display for a first user overlaps with a second gaze portion of the transparent display for the a second user, and the first gaze portion and the second gaze portion overlap with the given portion of the transparent display whereat said union of the at least one first image segment and the at least one second image segment is to be presented; and
when it is detected that the first gaze portion overlaps with the second gaze portion, and the first gaze portion and the second gaze portion overlap with the given portion of the transparent display,
determining respective optical depths at which the first user and the second user are gazing, based on respective gaze directions of eyes of the first user and the second user;
detecting, based on the respective optical depths at which the first user and the second user are gazing and an optical depth at which the at least one virtual object is being presented, when the first user is gazing at a real-world environment through the first gaze portion of the transparent display, while the second user is gazing at the at least one virtual object being presented at the second gaze portion of the transparent display; and
when it is detected that the first user is gazing at the real-world environment through the first gaze portion of the transparent display, while the second user is gazing at the at least one virtual object being presented at the second gaze portion of the transparent display, deactivating a first portion of the controllable parallax barrier that corresponds to the first gaze portion of the transparent display.

\* \* \* \* \*